Patented Apr. 6, 1948

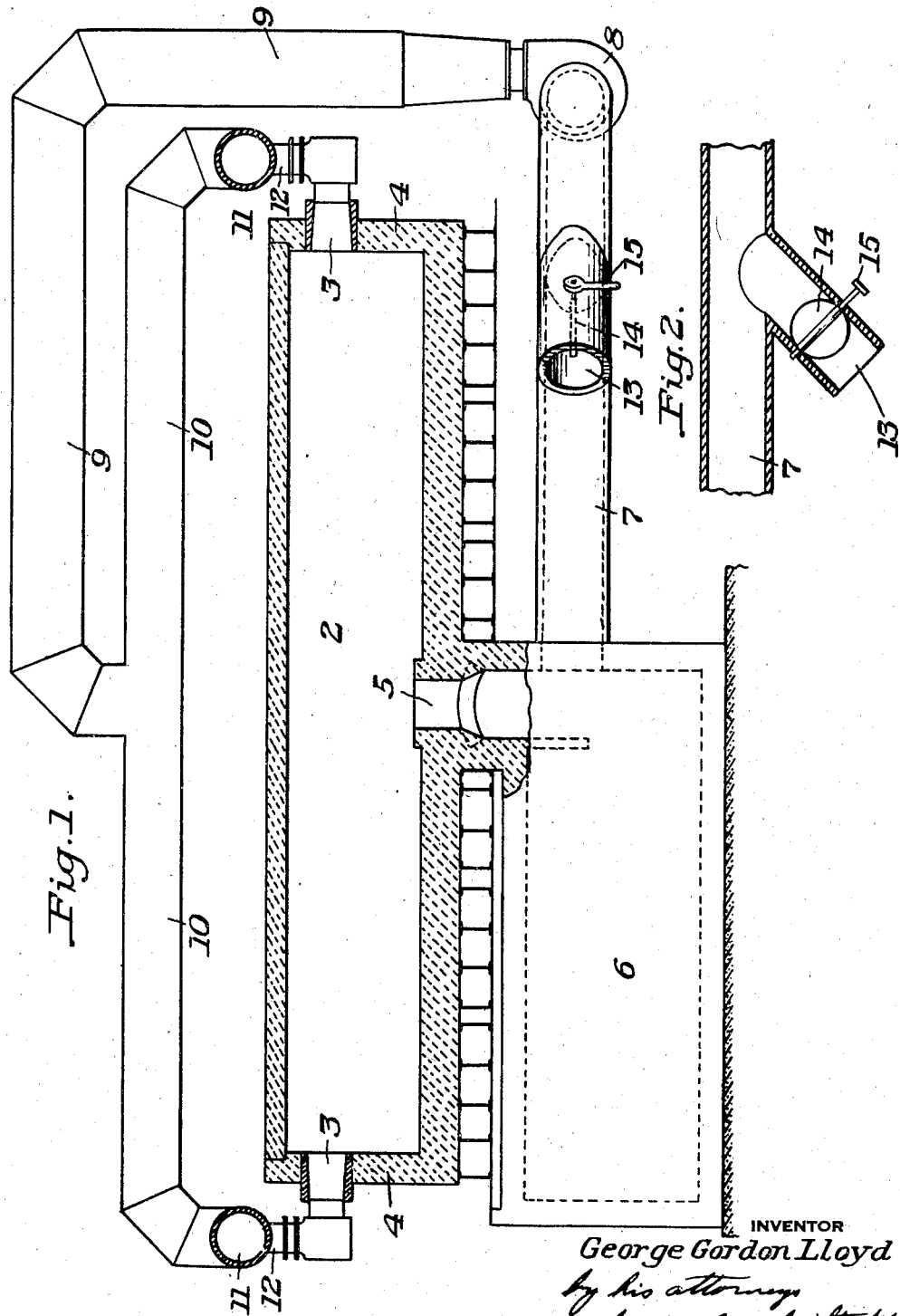

2,439,309

UNITED STATES PATENT OFFICE 2,439,309

INDUSTRIAL FURNACE AND METHOD OF OPERATING THE SAME

George Gordon Lloyd, Pittsburgh, Pa., assignor to Loftus Engineering Corporation, Inc., Pittsburgh, Pa., a corporation of Maryland Application April 6, 1943, Serial No. 481,954

3 Claims. (Cl. 263—15)

This invention relates to industrial furnaces, especially those used for metallurgical purposes as, for example, soaking pits, bloom reheating furnaces, and like furnaces, and to a method of operating the same.

Furnaces of the type to which this invention relates usually embody an air pre-heater, for example a recuperator, through which spent gases from the furnace chamber are circulated before being discharged, and combustion air is drawn by a fan through the pre-heater and delivered to the burner ports of the furnace chamber in a manner well understood in the art.

According to the present invention, provision is made for variably altering the temperature of the combustion air to alter the furnace temperature or "thermal head" of the furnace and thereby better adapt it to such special or critical operating conditions as may be required. This is accomplished by providing a controllable vent or valved port opening into the hot air duct leading from the recuperator, preferably in advance of the fan. By regulation of air admitted at this port, the temperature or thermal head of the furnace may be controlled within very close tolerances, as will be hereinafter more fully apparent.

My invention may be more fully understood by reference to the accompanying drawing, in which:

Figure 1 is a more or less schematic outline of a bloom reheating furnace embodying my invention.

Figure 2 is a detail view showing the cold air intake port.

In the drawings, 2 designates an industrial furnace of any suitable or preferred form having a series of burners 3 at the opposite end walls 4 thereof. In the center of the bottom of the furnace is a downtake 5 for the removal of furnace gases, that is, products of combustion, and this downtake leads to a recuperator 6, which is shown to be under the furnace and which is of any known or preferred construction.

Leading from the recuperator 6 is a hot air duct 7 with a hot-air fan at 8 for drawing hot air from the recuperator. The fan discharges into a duct system comprising a duct 9 leading to two offtake pipes 10 at the top of the furnace. The pipes 10 in turn open into bustle pipes or manifolds 11 extending along each end of the furnace. These manifolds or bustle pipes supply air to the burners 3 through short connections or down-pipes 12.

So much of the structure as has been described is generally old and constitutes current practice in the art. According to my invention, there is a branch pipe 13 leading into the duct 7 between the recuperator and the fan. It is preferably disposed at an angle to the duct 7 so that incoming air merges into the heated air flowing through the duct. In this branch pipe 13 is an adjustable or regulable valve or control member 14, which may be manually operated by a handle 15, or may be automatically operated.

By opening or closing the valve element 14, more or less atmospheric air may be drawn into the duct 7 by the fan 8, correspondingly diminishing the amount of air pulled through the recuperator and diluting the hot air which is pulled through the recuperator. This, of course, reduces the amount of heat carried by the air into the furnace while maintaining the overall supply of air the same. Less heat being delivered to the furnace as hot air, less heat will be delivered to the recuperator, which in turn will reduce the temperature of the air delivered by the recuperator.

By this invention, the amount of fuel may be kept constant for any selected interval of time, which is desirable; the fan may run at constant speed, which is desirable, and very accurate and flexible control of the furnace may be secured. An incidental advantage arises due to the protection of the fan by reducing the temperature of the air.

While I have specifically mentioned bloom reheating furnaces, and the invention is applicable to bloom reheating furnaces, this is to be regarded as merely illustrative of my invention and it is applicable to all industrial furnaces, especially metallurgical furnaces where a recuperator or regenerator is used in conjunction with a forced circulation of combustion air. Also, various changes and modifications may be made in the apparatus within the contemplation of my invention.

I claim:

1. The method of operating a metallurgical heating furnace and maintaining a controlled thermal head therein which comprises supplying heated air for combustion to the furnace from a recuperator heated by the spent gases of the furnace, maintaining for selected time intervals the volume of heated combustion air delivered to the furnace substantially constant while controllably introducing atmospheric air into the heated air to reduce and regulate the reduction in the temperature thereof.

2. The method of operating a metallurgical heating furnace and maintaining a controlled thermal head therein which comprises supplying heated air for combustion to the furnace from a recuperator heated by the spent gases of the furnace, selectively varying the temperature and volume of air supplied by the recuperator to the furnace by diluting the heated air with a controlled volume of atmospheric air while maintaining for selected time intervals the total combustion air supplied to the furnace substantially uniform.

3. A metallurgical furnace adapted to operate with a controlled thermal head, said furnace comprising a metal-containing chamber, burners arranged to deliver fuel and air into the furnace for sustaining combustion therein, a recuperator, a flue for delivering hot products of combustion from said furnace to said recuperator, a duct system for conveying hot combustion air from the recuperator to the burners, a fan in said duct system on the outlet side of said recuperator for drawing air through the recuperator and propelling hot air through said system, and an inlet arranged to admit relatively cool atmospheric air to the hot air propelled into and through said fan, and means for regulating the quantity of cool air admitted by said inlet and controlling the temperature of the heated air propelled through the duct system to said burners.

GEORGE GORDON LLOYD.

REFERENCES CITED

The following references are of record in the file of this patent:

UNITED STATES PATENTS

| Number | Name | Date |
|---|---|---|
| 257,574 | Hartman | May 9, 1882 |
| 1,401,222 | Wiberg | Dec. 27, 1921 |
| 1,751,136 | Devel | Mar. 18, 1930 |
| 1,824,876 | Culbertson | Sept. 29, 1931 |
| 1,926,714 | Culbertson | Sept. 12, 1933 |
| 2,321,129 | Cooper | June 8, 1943 |
| 2,370,897 | Whitcomb | Mar. 6, 1945 |